US012725009B2

(12) United States Patent
Lee et al.

(10) Patent No.: US 12,725,009 B2
(45) Date of Patent: Sep. 1, 2026

(54) NOISE LEARNING-BASED DENOISING AUTOENCODER

(71) Applicant: Telefonaktiebolaget LM Ericsson (publ), Stockholm (SE)

(72) Inventors: Woonghee Lee, Seoul (KR); Ursula Challita, Solna (SE); Jingya Li, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 775 days.

(21) Appl. No.: 18/247,562

(22) PCT Filed: Oct. 4, 2021

(86) PCT No.: PCT/EP2021/077326
§ 371 (c)(1),
(2) Date: Mar. 31, 2023

(87) PCT Pub. No.: WO2022/073947
PCT Pub. Date: Apr. 14, 2022

(65) Prior Publication Data

US 2024/0095499 A1 Mar. 21, 2024

Related U.S. Application Data

(60) Provisional application No. 63/088,560, filed on Oct. 7, 2020.

(51) Int. Cl.
*G06N 3/0455* (2023.01)
*G06N 3/048* (2023.01)

(52) U.S. Cl.
CPC .......... *G06N 3/0455* (2023.01); *G06N 3/048* (2023.01)

(58) Field of Classification Search
CPC ........ G06N 3/0455; G06N 3/048; G06N 3/04; G06N 3/08; G06N 3/063
See application file for complete search history.

(56) References Cited

U.S. PATENT DOCUMENTS 10,291,268 B1 * 5/2019 Migliori ............... G06N 3/0455
2018/0314985 A1 * 11/2018 O'Shea ................ G06N 3/0455
(Continued)

FOREIGN PATENT DOCUMENTS

CN 107590778 A 1/2018

OTHER PUBLICATIONS

Lin, Ju, et al. "Speech enhancement using forked generative adversarial networks with spectral subtraction." Proceedings of Interspeech 2019 (2019). (Year: 2019).*
(Continued)

*Primary Examiner* — Kamran Afshar
*Assistant Examiner* — Brian J Hales
(74) *Attorney, Agent, or Firm* — Rothwell, Figg, Ernst & Manbeck, P.C.

(57) ABSTRACT

Methods and apparatuses for noise learning-based denoising of noisy input data Y that is equal to the original data X plus the noise N (i.e., Y=X+N). In contrast with a conventional denoising autoencoder (DAE) method that attempts to learn the original data X directly from noisy input data Y, the noise learning-based denoising learns the noise N in the noisy input data Y and then regenerates the original data X by subtracting the learned noise N from the noisy input data Y. Learning the noise N may include inputting the noisy input data Y into an encoder of a neural network, and the learned noise N may be output from a decoder of the neural network. Training the neural network may include inputting noisy
(Continued)

training data into an encoder of the neural network and outputting training noise from a decoder of the neural network.

20 Claims, 9 Drawing Sheets

(56) References Cited

U.S. PATENT DOCUMENTS

2019/0096038 A1 3/2019 El-Khamy et al.
2020/0034948 A1* 1/2020 Park ..................... G06N 3/0455

OTHER PUBLICATIONS

I. Dokmanic, R. Parhizkar, J. Ranieri and M. Vetterli, "Euclidean Distance Matrices: Essential theory, algorithms, and applications," in IEEE Signal Processing Magazine, vol. 32, No. 6, pp. 12-30, Nov. 2015 (Year: 2015).*

International Search Report and Written Opinion issued in International Application No. PCT/EP2021/077326, dated Apr. 7, 2022 (19 pages).

Lin, Ju et al., "Speech Enhancement Using Forked Generative Adversarial Networks with Spectral Subtraction" INTERSPEECH 2019, Sep. 15, 2019 (Sep. 15, 2019), pp. 3163-3167, XP055882288.

Yang, Liuqing et al., "Random Noise Attenuation Based on Residual Convolutional Neural Network in Seismic Datasets", IEEE Access, IEEE, USA, vol. 8, Feb. 7, 2020 (Feb. 7, 2020), pp. 30271-30286, XP011773288.

Ma, Yinjin et al., "Low-Dose CT Image Denoising Using a Generative Adversarial Network With a Hybrid Loss Function for Noise Learning", IEEE Access, IEEE, USA, vol. 8, Apr. 7, 2020 (Apr. 7, 2020), pp. 67519-67529, XP011784329.

Barazideh, Reza et al., "Impulsive Noise Detection in OFDM-based Systems: A Deep Learning Perspective", 2019 IEEE 9th Annual Computing and Communication Workshop and Conference (CCWC), IEEE, Jan. 7, 2019 (Jan. 7, 2019), pp. 937-942, XP033530448.

* cited by examiner 100
102
104
Input layer
Hidden layer
Output layer
y
$\tilde{n}$
Encoding
Decoding
−
$\tilde{x}_{nl}$
106

NOISE LEARNING-BASED DENOISING AUTOENCODER

CROSS REFERENCE TO RELATED APPLICATION

This application is a 35 U.S.C. § 371 National Phase Entry Application from PCT/EP2021/077326, filed Oct. 4, 2021, designating the United States, which claims priority to U.S. provisional patent application No. 63/088,560, filed Oct. 7, 2020, the disclosures of which are incorporated herein by reference in their entirety.

TECHNICAL FIELD

This disclosure relates to a noise learning-based denoising autoencoder.

BACKGROUND

Machine learning (ML) has recently received much attention as a key enabler for future wireless networks. Among the ML algorithms, denoising autoencoder (DAE) is widely utilized to improve the performance of applications in wireless networks by denoising observed data that includes the original data and noise. DAE is a neural network model for unsupervised learning of a representation based on the construction of the learned representations robust to an addition of noise to the input samples. The mechanism of DAE can be represented by two parts: (1) optimizing the neural network by training a noisy training dataset toward the true input dataset and (2) denoising an input dataset using the optimized neural network. The representative feature of DAE is that the dimension of the latent space is smaller than the size of the input vector, which means that the neural network model is capable of encoding/decoding through the smaller dimension where the data can be represented.

SUMMARY

From an information theoretical perspective, a conventional denoising autoencoder (DAE) method attempts to minimize the expected reconstruction error by maximizing a lower bound on mutual information I(X;Y), where X is a random variable for the original data, N is a random variable for the noise, and Y is a random variable for the noisy observations (i.e., Y=X+N). In other words, a conventional DAE method uses Y in an attempt to capture the information of X as much as possible even though Y is a function of noisy input. In addition, from a manifold learning perspective, the conventional DAE method can be seen as a way to find a manifold where Y can represent the data in a low dimensional latent space corresponding to X. However, the stochastic feature of X to be restored is often too complex to regenerate or represent. This is known as the curse of dimensionality. That is, the dimension of latent space for X is too high. Another problem with the conventional DAE method is that it can require a large training dataset to achieve good performance.

Aspects of the invention may overcome one or more of the problems with the conventional DAE method by improving the performance of the DAE method. Some aspects may improve the performance of the conventional DAE method by modifying the structure of the DAE method. The new denoiser with the modified structure may be a noise learning-based DAE (nlDAE) method.

In some aspects, the nlDAE method may regenerate the original data from a noisy input by learning the noise through a neural network and then subtracting the regenerated noise from the input. Thus, the nlDAE method may differ from the conventional DAE, which attempts to learn the original data directly.

Two case studies validate the improved performance of nlDAE: (1) symbol demodulation and (2) precise localization. Numerical results show that nlDAE requires a smaller latent space dimension and a smaller training dataset compared to DAE.

The new denoising framework of nlDAE may be inspired by the fact that the commutative law does not hold for nonlinear operations, and encoding and decoding through a neural network are nonlinear operations.

Aspects of nlDAE may provide the advantage of maximizing the efficiency of the machine learning (ML) approach (e.g. the required dimension of the latent space or number of training dataset) in wireless communications where the noise N is typically easier to regenerate than the original data X owing to their stochastic characteristics. This can result in more accurate reconstruction of the original signal, which is advantageous for various wireless communication applications.

In some aspects, nlDAE may provide improved network performance due to better reconstruction accuracy. In some aspects, nlDAE may require less data from training/learning. Therefore, nlDAE may be a more energy efficient scheme than the conventional DAE technique.

Aspects of nlDAE are applicable to various wireless communication applications such as, for example and without limitation, symbol demodulation and precise localization. Precise localization is important for various 5G applications such as factory automation and remote surgery.

One aspect of the invention may provide a denoising method. The method may include using a neural network to learn noise N in noisy input data Y. The method may include regenerating original data X by subtracting the learned noise N from the noisy input data Y.

In some embodiments, using the neural network to learn the noise N may include inputting the noisy input data Y into an encoder of the neural network, and the learned noise N may be output from a decoder of the neural network.

In some embodiments, the parameters θ and θ' of the neural network may be optimized as follows for all i ∈ {1, . . . , M}:

$$\theta^*, \theta'^* = \operatorname{argmin} \frac{1}{M} \sum_{i=1}^{M} \text{Loss}(n(i), g'_{\theta}(f_{\theta}(y(i))))$$

where Loss is a loss function, n is a realization vector of the noise N, y is a realization vector of the noisy input data Y, M is the number of training dataset, the parameter θ is {W,b}, W is a weight matrix for encoding, b is a bias vector for encoding, the parameter θ' is {W, b'}, W' is a weight matrix for decoding, b' is a bias vector for decoding, $g_{\theta'}$ is a decoding function of the decoder of the neural network, and $f_\theta$ is an encoding function of the encoder of the neural network.

In some embodiments, $f_\theta(y)=S(Wy+b)$, $g_{\theta'}(f_\theta(y))=S(W'(f_\theta(y))+b')$, and S is a sigmoid activation function for neural networks. In some embodiments, $$\tilde{x}_{nl}^{(j)}$$

is the j-th regenerated original data and is represented as follows for all $j \in \{1, \ldots, L\}$:

$$\tilde{x}_{nl}^{(j)} = y^{(j)} - \tilde{n}^{(j)} = y^{(j)} - g_{\theta'^*}\left(f_{\theta^*}\left(y^{(j)}\right)\right).$$

In some embodiments, the method may further include determining whether to use a noise learning-based denoising autoencoder (nlDAE) method or a denoising autoencoder (DAE) method that learns the original data X directly. In some embodiments, the method may include using the neural network to learn the noise N and regenerating the original data X by subtracting the learned noise N from the noisy input data Y in response to determining to use the nlDAE method. In some embodiments, determining whether to use the nlDAE method or the DAE method may be based on a ratio between the standard deviation of the noise N and the standard deviation of the original data X. In some embodiments, determining whether to use the nlDAE method or the DAE method may be based on the mutual information between the original data X and the noisy observations Y. In some embodiments, determining whether to use the nlDAE method or the DAE method may be based on the mutual information between the noise N and the noisy observations Y.

In some embodiments, the method may include training the neural network, and training the neural network may include inputting noisy training data into an encoder of the neural network and outputting training noise from a decoder of the neural network.

In some embodiments, the noisy input data Y may be subcarrier signals of an orthogonal frequency-division multiplexing (OFDM) scheme, the regenerated original data X may be the original subcarrier signals, and the method may further include demodulating the original subcarrier signals.

In some embodiments, the noisy input data Y may be estimated distances between a target node and reference nodes, and the method may further include using the original data X to estimate the position of the target node.

In some embodiments, the noisy input data Y may be a corrupted image, the noise N may be corruptions in the image, and the original data X may be the original image.

Another aspect of the invention may provide an apparatus adapted to use a neural network to learn noise N in noisy input data Y and regenerate original data X by subtracting the learned noise N from the noisy input data Y.

In some embodiments, the neural network may include an encoder and a decoder.

In some embodiments, the apparatus may include a subtractor configured to subtract the learned noise N from the noisy input data Y.

Still another aspect of the invention may provide a method for training a noise learning-based denoising autoencoder (nlDAE). The method may include inputting noisy input data Y into an encoder of a neural network. The method may include outputting noise N from a decoder of the neural network.

Yet another aspect of the invention may provide an apparatus adapted to receive noisy input data Y at inputs to an encoder of a neural network and output noise N from a decoder of the neural network.

Still another aspect of the invention may provide a computer program comprising instructions for adapting an apparatus to perform any of the methods set forth above.

Yet another aspect of the invention may provide a carrier containing the computer program. The carrier may be one of an electronic signal, optical signal, radio signal, or compute readable storage medium.

Still another aspect of the invention may provide an apparatus including processing circuitry and a memory. The memory may contain instructions executable by said processing circuitry, whereby said apparatus is operative to perform any of the methods set forth above.

Yet another aspect of the invention may provide an apparatus adapted to perform any of the methods set forth above.

Still another aspect of the invention may provide any combination of the aspects set forth above.

BRIEF DESCRIPTION OF THE DRAWINGS

The accompanying drawings, which are incorporated herein and form part of the specification, illustrate various embodiments.

DETAILED DESCRIPTION

Notations

The following notations will be used throughout this description.

(i) X, N, Y: random variables for the original data, the noise, and the noisy observations, respectively, where Y=X+N.

(ii) $x, n, y \in R^P$: the realization vector of X, N, Y, respectively, whose dimensions are P.

(iii) P'(<P): the dimension of the latent space.

(iv) $W \in R^{P'XP}$, $W' \in R^{PXP'}$: the weight matrices for encoding and decoding, respectively.

(v) $b \in R^{P'}$, $b' \in R^P$: the bias vectors for encoding and decoding, respectively.

(vi) S: the sigmoid activation function for neural networks, i.e. $S(a)=1/(1+e^{\hat{}-a})$, and $S(a)=(S(a(1)), \ldots, S(a(P)))^T$ where $a \in RP$ is an arbitrary input vector.

(vii) $f_\theta$: the encoding function where the parameter θ is {W,b}, i.e. $f_\theta(y)=S(Wy+b)$.

(viii) $g_{\theta'}$: the decoding function where the parameter θ' is {W',b'}, i.e. $g_{\theta'}(f_\theta(y))=S(W'(f_\theta(y))+b')$.

(ix) M: the number of training dataset.

(x) L: the number of test dataset.

Conventional DAE

As noted above, the philosophy of conventional denoising autoencoder (DAE) is to regenerate the original data x from the noisy observation y by training the neural network. That is, when training the neural network using the conventional DAE model, the noisy observation y is fed as the input to the encoder part of the network, and the original data x is the output of the decoder of the network. Thus, the parameters of the DAE model can be optimized to minimize the average reconstruction error in training phase as follows:

$$\theta^*, \theta'^* = \operatorname{argmin} \frac{1}{M}\sum_{i=1}^{M} \mathrm{Loss}(x^{(i)}, g'_{\theta}(f_{\theta}(y^{(i)}))) \tag{1}$$

where Loss is a loss function such as squared error between two inputs. Then, the j-th regenerated data $\tilde{x}^{(j)}$ from $y^{(j)}$ in operating phase can be obtained as follows for all $j \in \{1, \ldots, L\}$:

$$\tilde{x}^{(j)} = g_{\theta'^*}(f_{\theta} * (y^{(j)})) \tag{2}$$

The sigmoid function S is a nonlinear operation and is included in both encoding and decoding functions in the neural network. Thus, the commutative law does not hold in this operation.

nlDAE

Because encoding and decoding through a neural network are nonlinear operations for which the commutative law does not hold, learning the noise N from the noisy observations Y (instead of learning the original data X from the noisy observations Y as in conventional DAE) can be beneficial in some cases even if the ultimate objective is still to reconstruct the original data X. Noise learning-based DAE (nlDAE) learns the noise N from the noisy observations Y and then subtracts the learned noise N from the noisy observations Y.

Figures 1A, 1B:
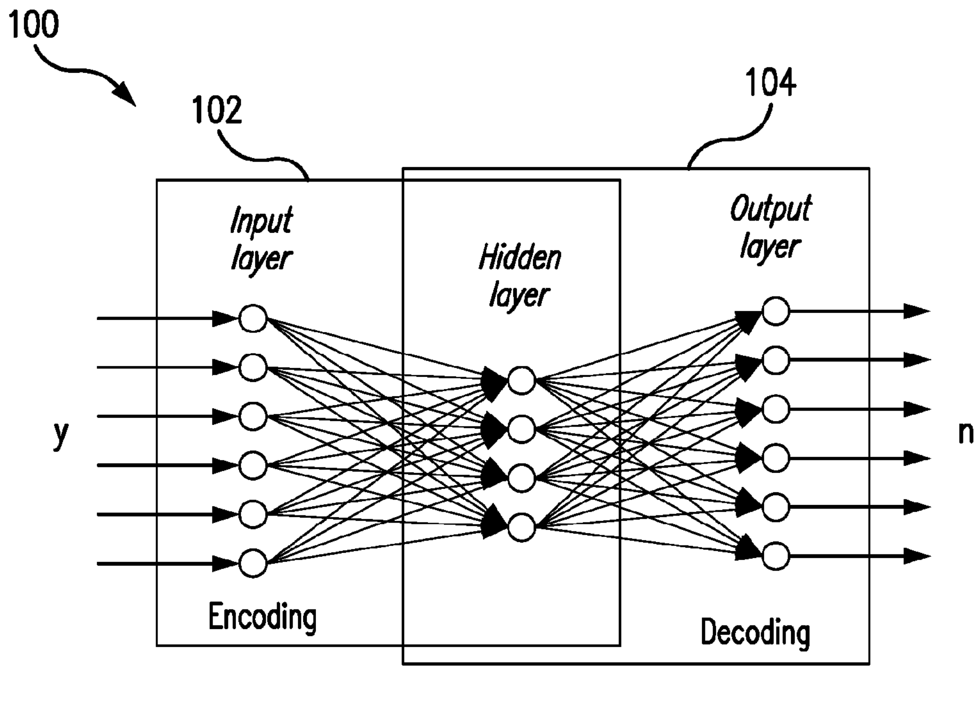
FIGS. 1A and 1B illustrate noise learning-based DAE (nlDAE) training and operating phases, respectively, according to some embodiments.

FIGS. 1A and 1B illustrate an nlDAE 100 in training and operating phases, respectively, according to some embodiments. In some embodiments, the nlDAE 100 may include one or more of an encoder 102, a decoder 104, and a subtractor 106. In some embodiments, the encoder 102 and decoder 104 of the nlDAE 100 may be part of a neural network. In some embodiments, as shown in FIGS. 1A and 1B, the neural network of the nlDAE 100 may include an input layer, an output layer and one or more hidden layers connecting the input and output layers. In some embodiments, the output layer may have the same number of nodes (neurons) as the input layer. In some embodiments, the parameters of the nlDAE 100 may be optimized as follows for all $i \in \{1, \ldots, M\}$:

$$\theta^*, \theta'^* = \operatorname{argmin} \frac{1}{M}\sum_{i=1}^{M} \mathrm{Loss}(n(i), g'_{\theta}(f_{\theta}(y(i)))) \tag{3}$$

where Loss is a loss function such as squared error between two inputs.

$\tilde{x}_{nl}^{(j)}$ denotes the j-th regenerated data based on an nlDAE model.

$\tilde{x}_{nl}^{(j)}$ can be represented as follows for all $j \in \{1, \ldots, L\}$:

$$\tilde{x}_{nl}^{(j)} = y^{(j)} - \tilde{n}^{(j)} = y^{(j)} - g_{\theta'^*}(f_{\theta^*}(y^{(j)})) \tag{4}$$

As shown in FIG. 1A, when training the neural network of the nlDAE 100, the noisy observation y is fed as the input to the encoder 102, and the noise n=y−x is the output of the decoder 104. This is different from the conventional DAE model, where the original data x is the output of the decoder during training. As shown in FIG. 1B, when denoising a data set using the nlDAE 100, the trained nlDAE based neural network first regenerates the noise (ñ) and the de-noised data $(\tilde{x}_{nl}^{(j)})$ is obtained by subtracting the regenerated noise from the noisy data (i.e., y−ñ).

In this way, nlDAE is a new denoiser framework based on the neural network. In some embodiments, the nlDAE 100 regenerates the original data X from a noisy input Y by learning the noise N through a neural network and subtracting the regenerated noise N from the input Y. Thus, nlDAE differs from the conventional DAE, which attempts to learn the original data X directly. Aspects of nlDAE may provide the advantage of maximizing the efficiency of the machine learning (ML) approach (e.g. the required dimension of the latent space P' or number of training dataset L) in wireless communications where the noise N is typically easier to regenerate than the original data X owing to their stochastic characteristics. Aspects of nlDAE may be applicable to various wireless communication applications such as, for example and without limitation, symbol demodulation and precise localization. Experimental results support that nlDAE is efficient to denoise the noisy input data Y in terms of the required dimension of the latent space P' and the number of training dataset L. Aspects of nlDAE may be applicable in other domains such as, for example and without limitation, image inpainting, needed to regenerate the sample corruptions. Aspects may also relate to selecting between DAE and nlDAE.

Comparison of DAE and nlDAE

DAE and nlDAE were both used determine used to determine original data X from noisy observations Y in two examples where Y=X+N. In the first example, the objective is to reconstruct X from Y according to the variation of a N where X~Unif(0,2√3), i.e. $\sigma_X$ is 1, and N~Normal(0, $\sigma_N$). In the second example, X~Exp(1), i.e. $\sigma_X$ is 1, and all settings are equal to the first example.

Figure 2:
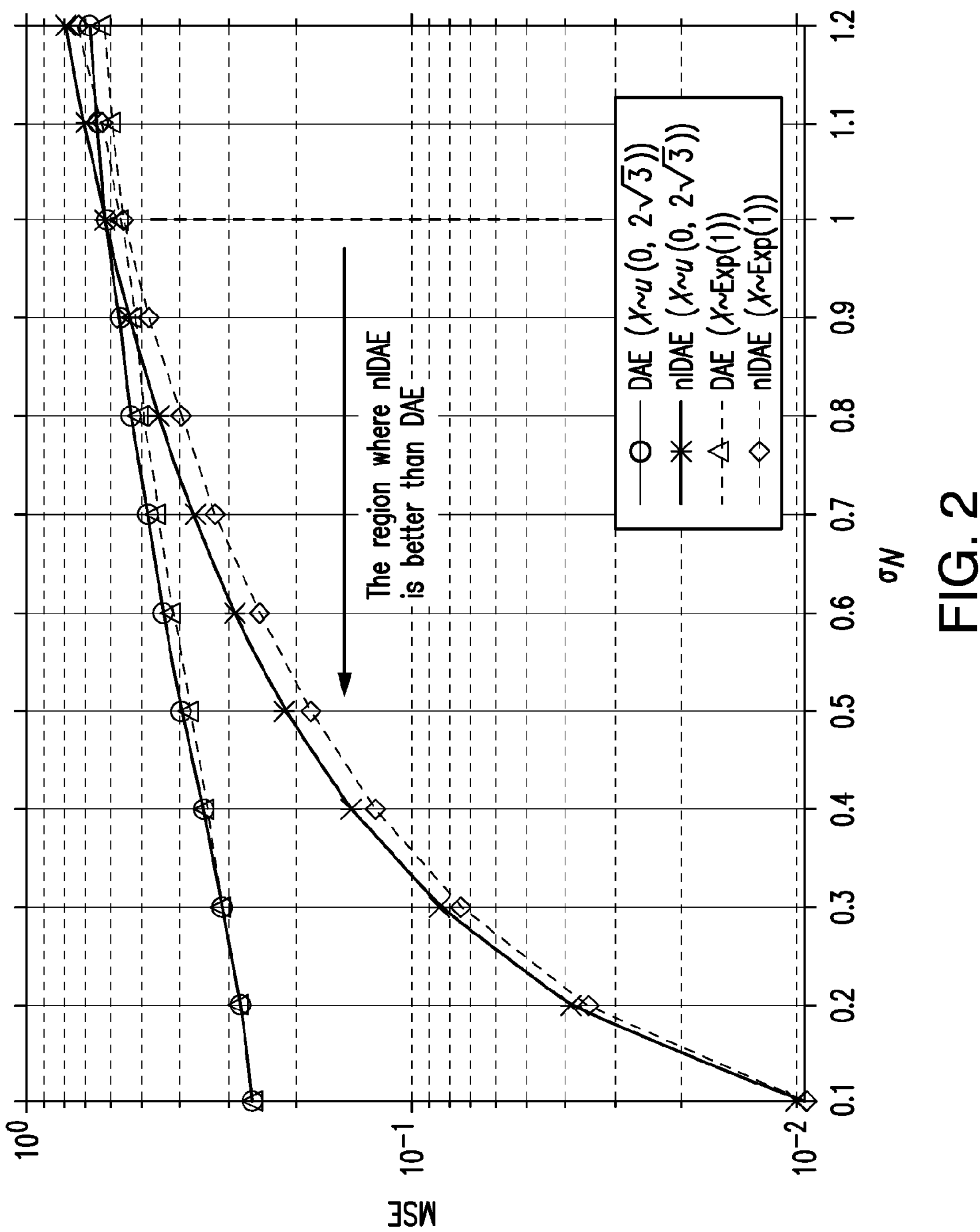
FIG. 2 illustrates experimental results of using both DAE and nlDAE to determine original data X from noisy observations Y in two examples where Y=X+N.

FIG. 2 illustrates the results of using both DAE and nlDAE to determine original data X from noisy observations Y in two examples where Y=X+N. The probability distribution of X is fixed, and the standard deviation of N varies in these two scenarios. FIG. 2 shows the performances of DAE and nlDAE in terms of mean squared error (MSE) for the two examples. In these examples, the squared error and the scaled conjugate gradient are applied as the loss function and the optimization method, respectively, and P and P' are 12 and 9, respectively.

As shown in FIG. 2, nlDAE is superior to DAE when the standard deviation of the noise N (i.e., $\sigma_N$) is smaller than the standard deviation of the original data X (i.e., $\sigma_X$) This implies that the standard deviation is an important factor when choosing between DAE and nlDAE for the denoiser. FIG. 2 also shows that the exponential distribution can be regenerated better than the uniform distribution in both DAE and nlDAE notwithstanding the same $\sigma_X$. This is because I(X;Y) with X~Unif(0, $2\sqrt{3}$) is smaller than I(X;Y) with X~Exp(0,1). Therefore, the mutual information I(X;Y) also affects the reconstruction performance in addition to $\sigma_X$.

In some embodiments, a denoising framework may select between the nlDAE method and a conventional DAE method. In some embodiments, the selection may be made based on the ratio between a N and $\sigma_X$, where $\sigma_N$ and $\sigma_X$ denote the standard deviation of the noise and the standard deviation of the original data, respectively. In some embodiments, the selection may additionally or alternatively be based on the mutual information between the original data X and the noisy observations Y (i.e., I(X;Y)). In some embodiments, the selection may additionally or alternatively be based on the mutual information between the noise N and the noisy observations Y (i.e., l(N;Y)).

Two case studies (one relating to symbol demodulation and one relating to precise localization) validate nlDAE in the domain of wireless networks.

Symbol Demodulation in OFDM Systems

In some embodiments, nlDAE may be applied to symbol demodulation in orthogonal frequency-division multiplexing (OFDM) systems. Here, the objective may be to minimize the symbol error rate (SER) over the whole subcarriers by maximizing the quality of denoising the received signal. The target(s) of the denoising may be (i) the vector of real parts of sampled signal at receiver and/or (ii) the vector of imaginary parts of sampled signal at receiver.

The performance of nlDAE was evaluated with cubic interpolation selected as the algorithm for channel estimation and 5000 as the number of test dataset (L=5000). For simulation parameters, 12 subcarriers, four-quadrature amplitude modulation (4-QAM) as the modulation for the subcarriers, a subcarrier spacing of 15 kHz, and a pilot spacing for channel estimation of 3 were used. For performance evaluation, it was assumed that (i) the channel gain follows the zero mean complex normal distribution and (ii) the tap delay follows Unif($0.10^{-6}$). For performance comparison, (i) the result of a conventional denoiser using DAE, (ii) the result of a non-ML system using only cubic interpolation, and (iii) the theoretical upper-bound with the perfect channel frequency response (CFR) were also provided.

Figure 3A:
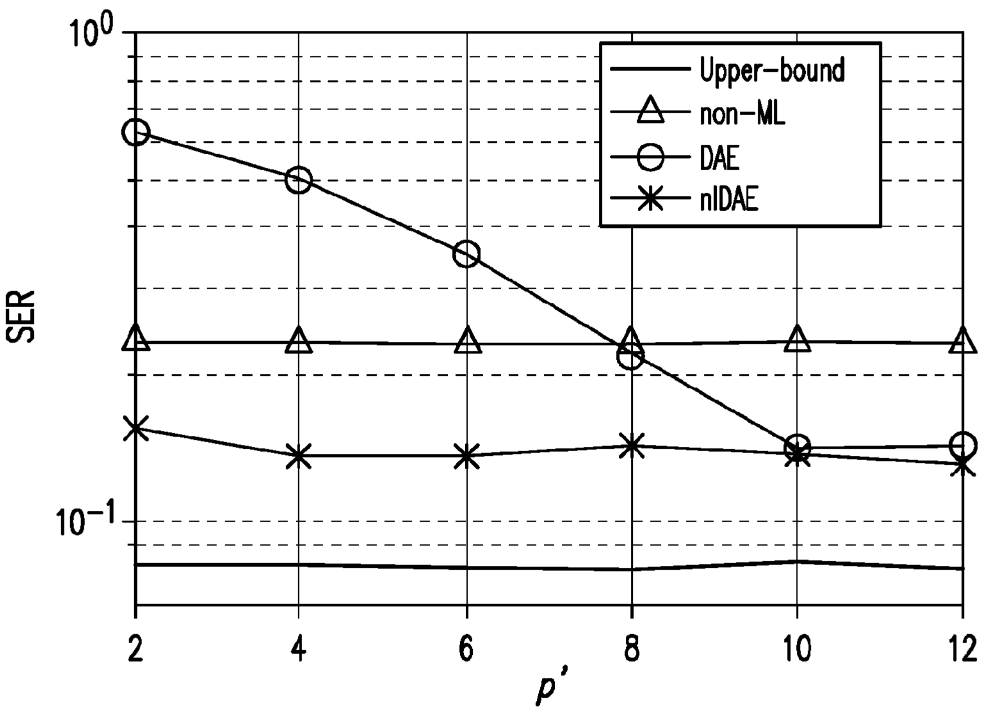
FIGS. 3A-3C show symbol error rate (SER) according to the dimension of latent space, the number of training dataset, and signal-to-noise-ratio (SNR), respectively, for each of nlDAE, DAE, non-ML, and the theoretical upper-bound with the perfect CFR according to some embodiments.
Figure 3B:
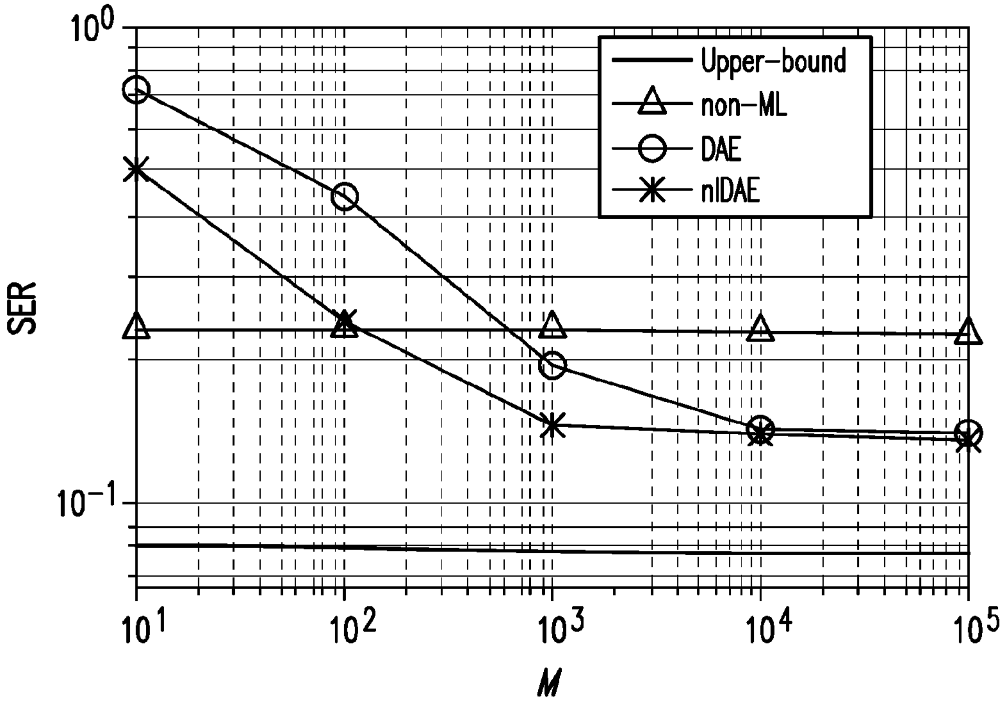
Figure 3C:
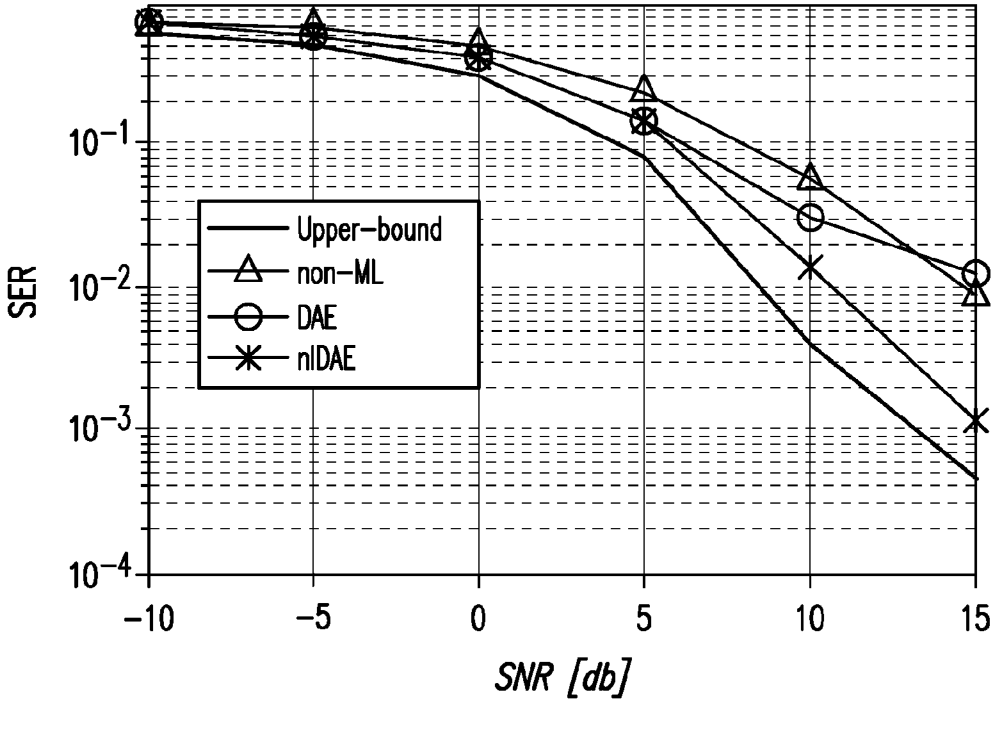

FIGS. 3A-3C show symbol error rate (SER) according to the dimension of latent space (P'), the number of training dataset (M), and signal-to-noise-ratio (SNR), respectively, for each of nlDAE, DAE, non-ML, and the theoretical upper-bound with the perfect CFR according to some embodiments. FIG. 3A shows SER with respect to the dimension of latent space (P'), where signal-to-noise ratio (SNR) is 5 dB and $M=10^4$. As shown in FIG. 3A, the SER performance of nlDAE is almost consistent for different latent space, which is better than the SER performances of non-ML and DAE. This means that nlDAE shows a good denoising performance even with an extremely small dimension of latent space if the training dataset is sufficient.

FIG. 3B shows SER with respect to the number of training dataset (M), where SNR is 5 dB and P'=9. As illustrated in FIG. 3B, both DAE and nlDAE show better performance than non-ML after $M=10^3$. Furthermore, nlDAE shows that the performance converges when $M=10^3$. For DAE, the convergence point is at $M=10^4$. This shows that nlDAE requires much less training dataset than DAE.

FIG. 3C shows SER with respect to SNR, where P'=9 and $M=10^4$. As shown in FIG. 3C, the performance of nlDAE improves rapidly as the SNR increases. Especially in SNR regimes higher than 5 dB, nlDAE achieves better SER performance than DAE. Furthermore, when SNR is 15 dB, DAE is even worse than non-ML. The experimental results imply that nlDAE is superior than DAE when a N is much smaller than ax (i.e., high SNR regime).

Precise Localization in Range-Based Positioning

In some embodiments, nlDAE may be applied to the problem of precise localization in range-based positioning. Here, the objective may be to minimize the localization error of the target node by maximizing the quality of denoising the estimated distances. In 2-D localization, P reference nodes and a single target node are randomly distributed. The goal may be to estimate the position of the target node with the knowledge of the locations of P reference nodes. The target of denoising may be the vector of the estimated distance between the target node and the reference nodes.

For this experiment, 12 reference nodes and one target node were placed uniform randomly in a 100×100 square. For performance evaluation, it was assumed that (i) the ranging error dependent to signal quality follows Normal(0, 10), (ii) the ranging error due to clock asynchronization follows Unif(0,20), (iii) the non line-of-sight (NLoS) event follows Ber(0.2), and (iv) the distance bias at the NLoS event is 50. The distance resolution was set to 10 for the distance measurement. For performance comparison, (i) the result of a conventional denoiser using DAE, (ii) the result of a non-ML system using only multidimensional scaling (MDS) based localization, and (iii) the theoretical upper-bound with the perfect denoising with only ranging error due to quantization for distance were provided.

Figure 4A:
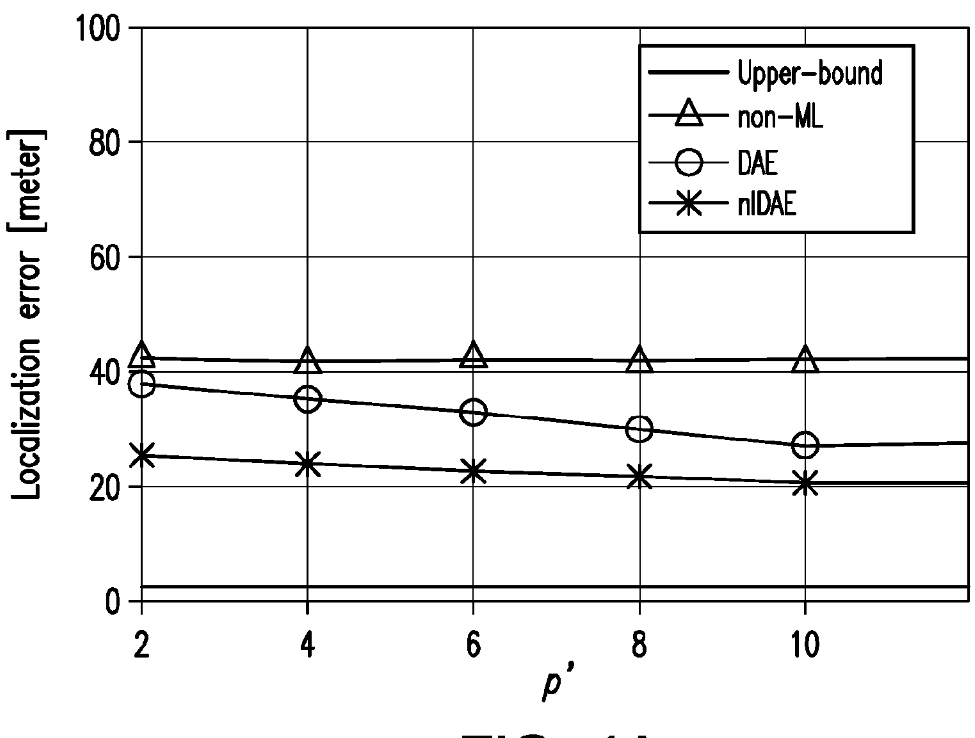
FIGS. 4A-4C show localization error with respect to the dimension of latent space (P'), the number of training dataset (M), and the probability of non line-of-sight event ($p_{NLOS}$), respectively, for each of nlDAE, DAE, non-ML, and the theoretical upper-bound with the perfect denoising with only ranging error due to quantization for distance according to some embodiments.
Figure 4B:
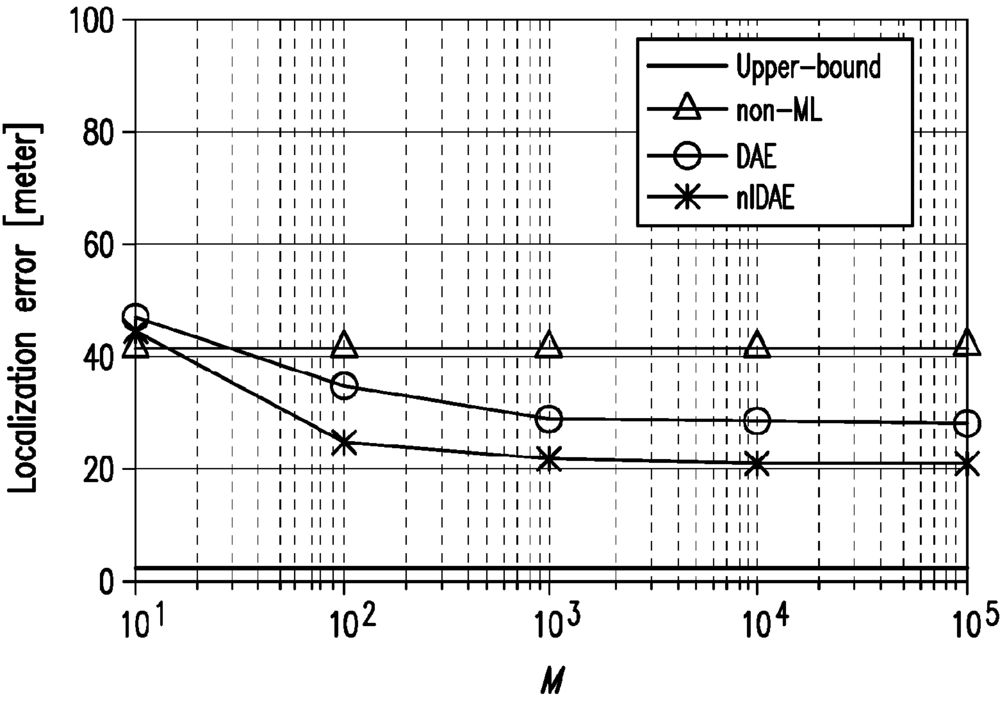
Figure 4C:
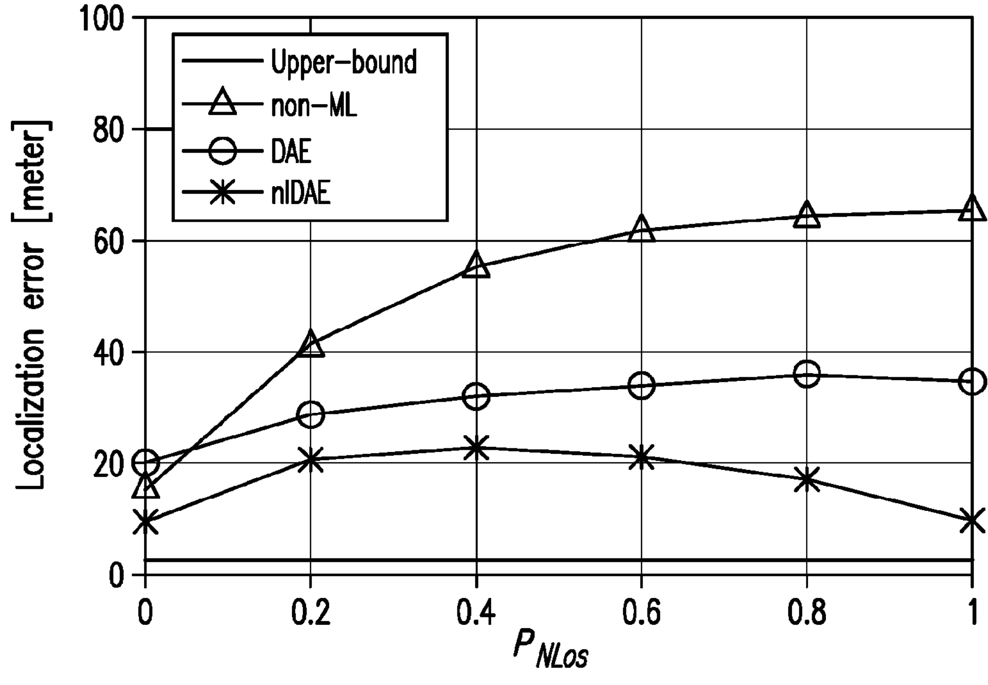

FIGS. 4A-4C show localization error with respect to the dimension of latent space (P'), the number of training dataset (M), and the probability of NLoS event ($p_{NLOS}$), respectively, for each of nlDAE, DAE, non-ML, and the theoretical upper-bound with the perfect denoising with only ranging error due to quantization for distance according to some embodiments. FIG. 4A shows localization error with respect to the dimension of latent space (P'), where the number of training dataset (M) is equal to $10^4$ ($M=10^4$). As shown in FIG. 4A, the performance of nlDAE is better than non-ML and DAE according to all values of P'. In addition, nlDAE results in the higher efficiency than DAE in terms of the required dimension of the latent space regarding the smaller sensitivity toward P'.

FIG. 4B shows localization error with respect to the number of training dataset (M), where the dimension of latent space (P') is equal to 9 (P'=9). As illustrated in FIG. 4B, both DAE and nlDAE show better performance than non-ML after $M=10^2$. In addition, nlDAE shows better performance than DAE regardless of M. Furthermore, the localization error almost converges for nlDAE when $M=10^2$. Hence, the experimental results verify that nlDAE requires less training data than DAE for the localization error.

FIG. 4C shows localization error with respect to the probability of NLoS event ($p_{NLOS}$), where the dimension of latent space (P') is equal to 9 (P'=9) and the number of training dataset (M) is equal to $10^4$ ($M=10^4$). As shown in FIG. 4C, the performance of nlDAE is a form of concave function over $p_{NLOS}$. This is due to the fact that the NLoS event follows Bernoulli distribution with a variance of $p_{NLOS}(1-p_{NLOS})$ For DAE, the results show a slightly concave behavior with a maximum at $p_{NLOS}=0.8$. For non-ML, as $p_{NLOS}$ increases, the localization error increases as expected due to the worse value of $\sigma_X/\sigma_N$ level.

Flowcharts

Figure 5:
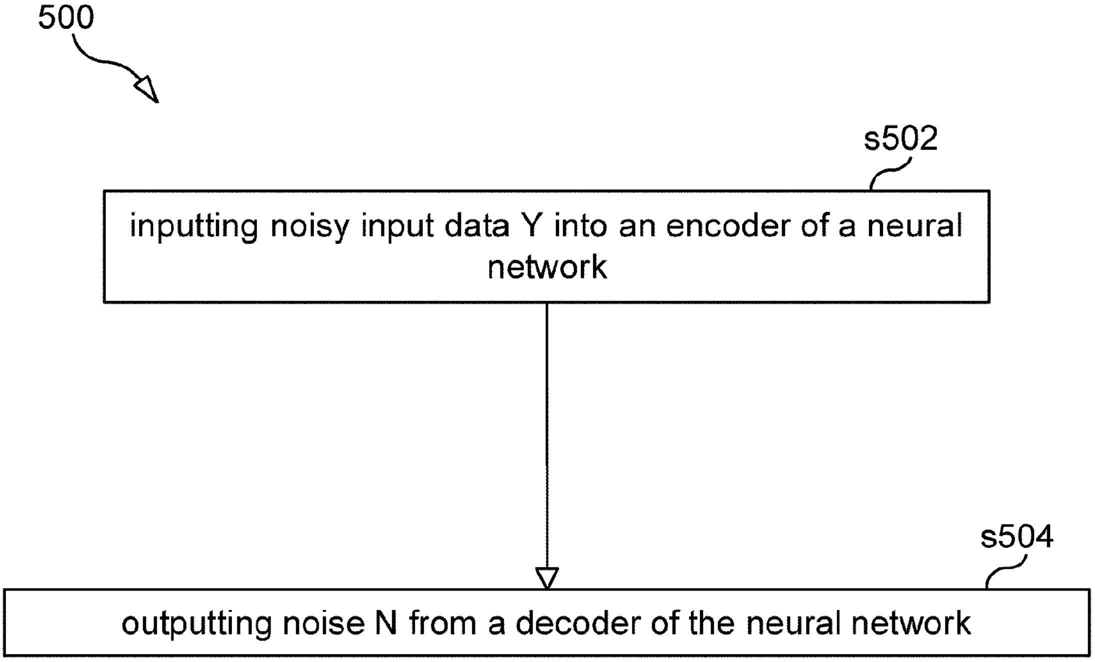
FIG. 5 is a flow chart illustrating a process according to some embodiments.

FIG. 5 illustrates a process 500 for training a noise learning-based denoising autoencoder (nlDAE) 100 according to some embodiments. In some embodiments, as shown in FIG. 5, the process 500 may include a step 502 of inputting noisy input data Y into an encoder 102 of a neural network. In some embodiments, the process 500 may include a step 504 of outputting noise N from a decoder 104 of the neural network.

Figure 6:
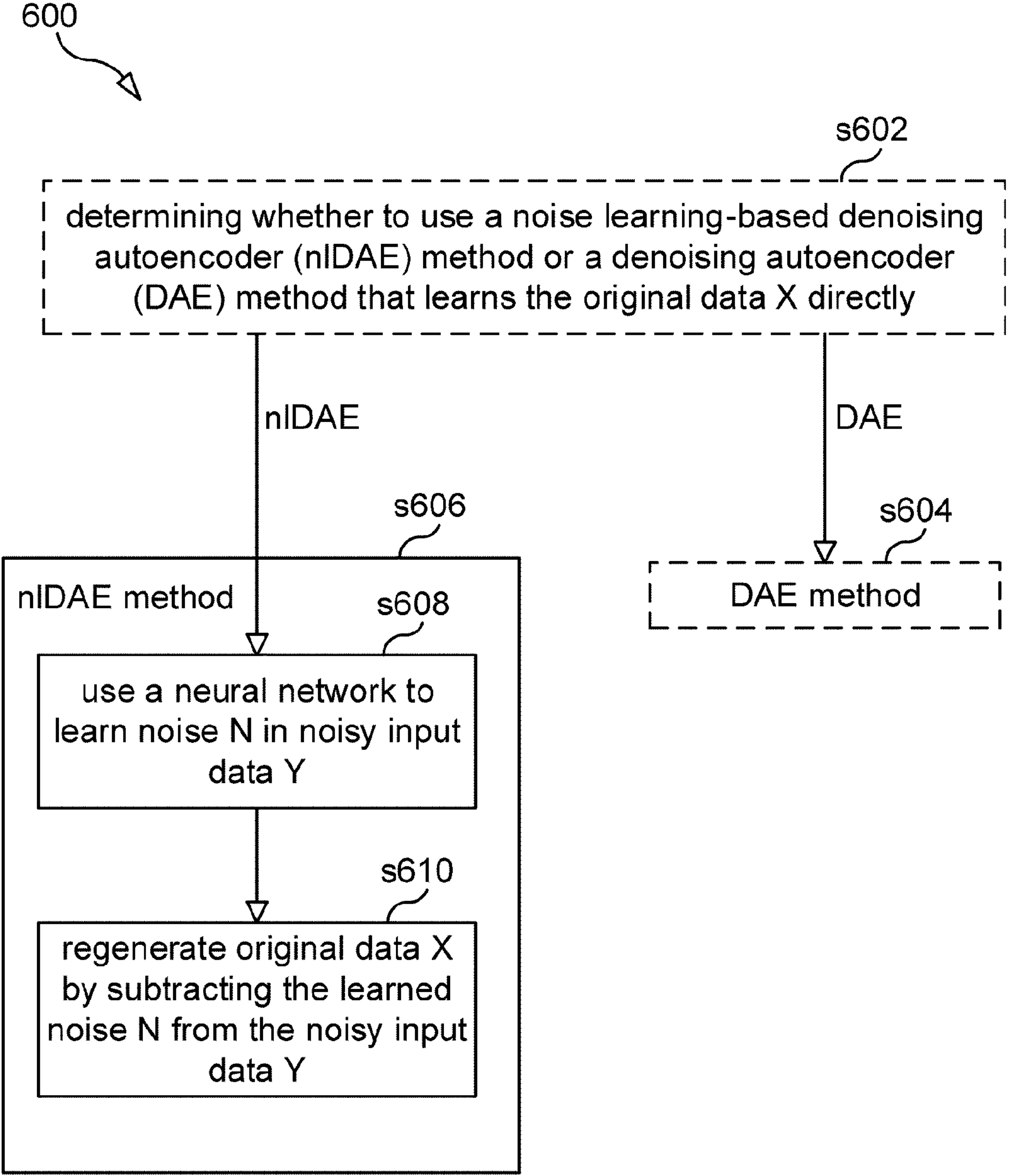
FIG. 6 is a flow chart illustrating a process according to some embodiments.

FIG. 6 illustrates a denoising process 600 according to some embodiments. In some embodiments, one or more steps (e.g., steps 608 and 610) of the process 600 may be performed by the noise learning-based denoising autoencoder (DAE) (nlDAE) 100. In some embodiments, the nlDAE 100 may include a neural network, and the neural network may include an encoder 102 and a decoder 104. In some embodiments, the nlDAE 100 may include a subtractor 106 configured to subtract the learned noise N from the noisy input data Y.

In some embodiments, as shown in FIG. 6, the process 600 may include a step 608 of using a neural network to learn noise N in noisy input data Y. In some embodiments, using the neural network to learn the noise N in step 608 may include inputting the noisy input data Y into an encoder 102 of the neural network, and the learned noise N may be output from a decoder 104 of the neural network.

In some embodiments, as shown in FIG. 6, the process 600 may include a step 610 of regenerating original data X by subtracting the learned noise N from the noisy input data Y.

In some embodiments, the parameters θ and θ' of the neural network may be optimized as follows for all $i \in \{1, \ldots, M\}$:

$$\theta^*, \theta'^* = \operatorname{argmin} \frac{1}{M}\sum_{i=1}^{M} \text{Loss}(n(i), g'_\theta(f_\theta(y(i))))$$

where Loss is a loss function, n is a realization vector of the noise N, y is a realization vector of the noisy input data Y, M is the number of training dataset, the parameter θ is {W,b}, W is a weight matrix for encoding, b is a bias vector for encoding, the parameter θ' is {W',b'}, W' is a weight matrix for decoding, b' is a bias vector for decoding, $g_{\theta'}$ is a decoding function of the decoder 104 of the neural network, and $f_\theta$ is an encoding function of the encoder 102 of the neural network.

In some embodiments, $f_\theta(y)=S(Wy+b)$, $g_{\theta'}(f_\theta(y))=S(W'(f_\theta(y))+b')$, and S is a sigmoid activation function for neural networks. In some embodiments, $$\tilde{x}_{nl}^{(j)}$$

is the j-th regenerated original data and is represented as follows for all $j \in \{1, \ldots, L\}$:

$$\tilde{x}_{nl}^{(j)} = y^{(j)} - \tilde{n}^{(j)} = y^{(j)} - g_{\theta'^*}\left(f_{\theta^*}\left(y^{(j)}\right)\right).$$

In some embodiments, the process 600 may include an initial step of training the neural network. In some embodiments, training the neural network may include inputting noisy training data into an encoder 102 of the neural network and outputting training noise from a decoder 104 of the neural network.

In some embodiments, as shown in FIG. 6, the process 600 may include an optional step 602 of determining whether to use a noise learning-based denoising autoencoder (nlDAE) method or a denoising autoencoder (DAE) method that learns the original data X directly. In some embodiments, determining whether to use the nlDAE method or the DAE method may be based on a ratio between the standard deviation of the noise N and the standard deviation of the original data X. In some embodiments, determining whether to use the nlDAE method or the DAE method may additionally or alternatively be based on the mutual information between the original data X and the noisy observations Y. In some embodiments, determining whether to use the nlDAE method or the DAE method may additionally or alternatively be based on the mutual information between the noise N and the noisy observations Y.

In some embodiments, as shown in FIG. 6, the process 600 may include an optional step 604 of performing the DAE method. In some embodiments, the process 600 may proceed from step 602 to step 604 in response to determining to use the DAE method in step 602.

In some embodiments, as shown in FIG. 6, the process 600 may include a step 606 of performing the nlDAE method. In some embodiments, the nlDAE method performed in step 606 may include using the neural network to learn the noise N and regenerating the original data X by subtracting the learned noise N from the noisy input data Y. In some embodiments, the step 606 may include steps 608 and 610. In some embodiments, the process 600 may proceed from step 602 to step 606 in response to determining to use the nlDAE method in step 602.

In some symbol demodulation embodiments, the noisy input data Y may be subcarrier signals of an orthogonal frequency-division multiplexing (OFDM) scheme, the regenerated original data X may be the original subcarrier signals, and the process 600 may further include a step of demodulating the original subcarrier signals.

In some precise localization in range-based positioning embodiments, the noisy input data Y may be estimated distances between a target node and reference nodes, and the process 600 may further include a step of using the original data X to estimate the position of the target node.

In some image inpainting embodiments, the noisy input data Y may be a corrupted image (e.g., a painting), the noise N may be corruptions in the image, and the original data X may be the original image.

Figure 7:
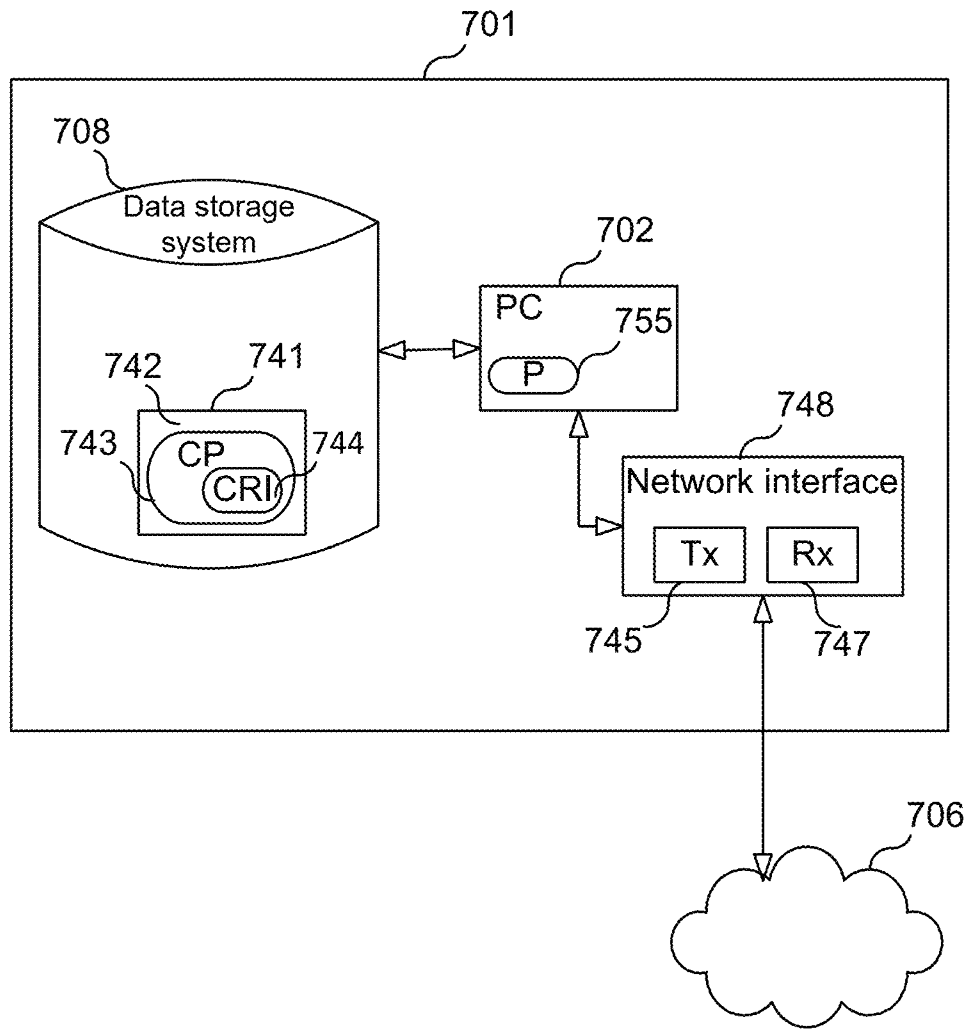
FIG. 7 is a block diagram of an apparatus for implementing an nlDAE according to some embodiments.

FIG. 7 is a block diagram of an apparatus 701. In some embodiments, the apparatus 701 may implement an nlDAE 100 according to some embodiments. In some embodiments, the apparatus 701 can be adapted to perform the methods disclosed herein. As shown in FIG. 7, the apparatus 701 may comprise: processing circuitry (PC) 702, which may include one or more processors (P) 755 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed; one or more network interfaces 748 (which may be co-located or geographically distributed) where each network interface includes a transmitter (Tx) 745 and a receiver (Rx) 747 for enabling apparatus 701 to transmit data to and receive data from other nodes connected to network 706 (e.g., an Internet Protocol (IP) network) to which network interface 748 is connected; and one or more storage units (a.k.a., "data storage systems") 708 which may be co-located or geographically distributed and which may include one or more non-volatile storage devices and/or one or more volatile storage devices. In embodiments where PC 702 includes a programmable processor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, magnetic media (e.g., a hard disk), optical media, memory devices (e.g., random access memory, flash memory), and the like. In some embodiments, the CRI 744 of computer program 743 is adapted such that when executed by PC 702, the CRI causes apparatus 701 to perform steps described herein (e.g., steps described herein with reference to the flow charts). In other embodiments, apparatus 701 may be adapted to perform steps described herein without the need for code. That is, for example, PC 702 may consist merely of one or more ASICs. Hence, the features of the embodiments described herein may be implemented in hardware and/or software.

Summary of Embodiments

A1. A denoising method (500) comprising: using a neural network to learn noise N in noisy input data Y; and regenerating original data X by subtracting the learned noise N from the noisy input data Y.

A2. The method of embodiment A1, wherein using the neural network to learn the noise N comprises inputting the noisy input data Y into an encoder of the neural network, and the learned noise N is output from a decoder of the neural network.

A3. The method of embodiment A2, wherein parameters θ and θ' of the neural network are optimized as follows for all i∈{1, . . . , M}:

$$\theta^*, \theta'^* = \operatorname{argmin} \frac{1}{M}\sum_{i=1}^{M}\text{Loss}(n(i), g'_{\theta}(f_{\theta}(y(i))))$$

where Loss is a loss function, n is a realization vector of the noise N, y is a realization vector of the noisy input data Y, M is the number of training dataset, the parameter θ is {W,b}, W is a weight matrix for encoding, b is a bias vector for encoding, the parameter θ' is {W',b'}, W' is a weight matrix for decoding, b' is a bias vector for decoding, $g_{\theta'}$ is a decoding function of the decoder of the neural network, and $f_\theta$ is an encoding function of the encoder of the neural network.

A4. The method of embodiment A3, wherein $f_\theta(y)=S(Wy+b)$, $g_{\theta'}(f_\theta(y))=S(W'(f_\theta(y))+b')$, and S is a sigmoid activation function for neural networks.

A5. The method of embodiment A3 or A4, wherein $\hat{x}_{nl}^{(j)}$ is the j-th regenerated original data and is represented as follows for all j∈{1, . . . , L}:

$$\hat{x}_{nl}^{(j)} = y^{(j)} - \hat{n}^{(j)} = y^{(j)} - g_{\theta'^*}\left(f_{\theta^*}\left(y^{(j)}\right)\right).$$

A6. The method of any one of embodiments A1-A5, further comprising: determining whether to use a noise learning-based denoising autoencoder (nlDAE) method or a denoising autoencoder (DAE) method that learns the original data X directly; and using the neural network to learn the noise N and regenerating the original data X by subtracting the learned noise N from the noisy input data Y in response to determining to use the nlDAE method.

A7. The method of embodiment A6, wherein determining whether to use the nlDAE method or the DAE method is based on a ratio between the standard deviation of the noise N and the standard deviation of the original data X.

A8. The method of embodiment A6 or A7, wherein determining whether to use the nlDAE method or the DAE method is based on the mutual information between the original data X and the noisy observations Y.

A9. The method of any one of embodiments A6-A8, wherein determining whether to use the nlDAE method or the DAE method is based on the mutual information between the noise N and the noisy observations Y.

A10. The method of any one of embodiments A1-A9, further comprising training the neural network, wherein training the neural network comprises: inputting noisy training data into an encoder of the neural network; and outputting training noise from a decoder of the neural network.

A11. The method of any one of embodiments A1-A10, wherein the noisy input data Y are subcarrier signals of an orthogonal frequency-division multiplexing (OFDM) scheme, the regenerated original data X are the original subcarrier signals, and the method further comprises demodulating the original subcarrier signals.

A12. The method of any one of embodiments A1-A10, wherein the noisy input data Y are estimated distances between a target node and reference nodes, and the method further comprises using the original data X to estimate the position of the target node.

A13. The method of any one of embodiments A1-A10, wherein the noisy input data Y are a corrupted image, the noise N is corruptions in the image, and the original data X is the original image.

B1. An apparatus (100) adapted to: use a neural network to learn noise N in noisy input data Y; and regenerate original data X by subtracting the learned noise N from the noisy input data Y.

B2. The apparatus of embodiment B1, wherein the neural network comprises an encoder (102) and a decoder (104).

B3. The apparatus of embodiment B1 or B2, wherein the apparatus comprises a subtractor configured to subtract the learned noise N from the noisy input data Y.

C1. A method (600) for training a noise learning-based denoising autoencoder (nlDAE) (100), the method comprising: inputting noisy input data Y into an encoder (102) of a neural network; and outputting noise N from a decoder (104) of the neural network.

D1. An apparatus (100) adapted to: receive noisy input data Y at inputs to an encoder (102) of a neural network; and output noise N from a decoder (104) of the neural network.

E1. A computer program comprising instructions for adapting an apparatus to perform the method of any one of embodiments A1-A13 and C1.

F1. A carrier containing the computer program of embodiment E1, wherein the carrier is one of an electronic signal, optical signal, radio signal, or compute readable storage medium.

G1. An apparatus (701), the apparatus comprising: processing circuitry (702); and a memory (742), said memory containing instructions (744) executable by said processing circuitry, whereby said apparatus is operative to perform the method of any one of the embodiments A1-A13 and C1.

H1. An apparatus (100) adapted to perform the method of any one of embodiments A1-A13 and C1.

I1. Any combination of the embodiments set forth above.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A denoising method comprising:

inputting noisy input data Y into an encoder of a neural network of a noise learning-based denoising autoencoder (nlDAE);

using the neural network of the nlDAE to learn noise N in the noisy input data Y;

outputting the learned noise N from a decoder of the neural network of the nlDAE; and using a subtractor of the nlDAE to regenerate original data X by subtracting the learned noise N from the noisy input data Y;

wherein parameters θ and θ' of the neural network are optimized as follows for all i ∈ {1, . . . , M}:

$$\theta^*, \theta'^* = \operatorname{argmin} \frac{1}{M} \sum_{i=1}^{M} \operatorname{Loss}(n(i), g'_\theta(f_\theta(y(i))))$$

where Loss is a loss function, n is a realization vector of the noise N, y is a realization vector of the noisy input data Y, M is a number of training dataset, the parameter θ is {W,b}, W is a weight matrix for encoding, b is a bias vector for encoding, the parameter θ' is {W,b}, W is a weight matrix for decoding, b' is a bias vector for decoding, go is a decoding function of the decoder of the neural network, and $f_\theta$ is an encoding function of the encoder of the neural network.

2. The method of claim 1, further comprising training the neural network, wherein training the neural network comprises:

inputting noisy training data into an encoder of the neural network; and outputting training noise from a decoder of the neural network.

3. The method of claim 1, wherein the noisy input data Y are subcarrier signals of an orthogonal frequency-division multiplexing (OFDM) scheme, the regenerated original data X are original subcarrier signals, and the method further comprises demodulating the original subcarrier signals.

4. The method of claim 1, wherein the noisy input data Y are estimated distances between a target node and reference nodes, and the method further comprises using the original data X to estimate a position of the target node.

5. The method of claim 1, wherein the noisy input data Y are a corrupted image, the noise N is corruptions in the corrupted image, and the original data X is an original image.

6. The method of claim 1, wherein $f_\theta$ (y)=S(Wy+b), $g_{\theta'}(f_\theta(y))$=S(W'($f_\theta$(y))+b'), and S is a sigmoid activation function for neural networks.

7. The method of claim 1, wherein $$\tilde{x}_{nl}^{(j)}$$

is a j-th regenerated original data and is represented as follows for all j ∈ {1, . . . , L}:

$$\tilde{x}_{nl}^{(j)} = y^{(j)} - \tilde{n}^{(j)} = y^{(j)} - g_{\theta'^*}\left(f_{\theta^*}\left(y^{(j)}\right)\right),$$

where L is a number of test dataset.

8. The method of claim 1, wherein the neural network of the nlDAE comprises an input layer, an output layer, and one or more hidden layers connecting the input and output layers.

9. A denoising method comprising:

determining whether to use a noise learning-based denoising autoencoder (nlDAE) method or a denoising autoencoder (DAE) method that learns an original data X directly, wherein determining whether to use the nlDAE method or the DAE method is based on one or more of (i) a ratio between a standard deviation of a noise N and a standard deviation of the original data X, (ii) mutual information between the original data X and a noisy input data Y, and (iii) mutual information between the noise N and the noisy input data Y; and in response to determining to use the nlDAE method:

inputting noisy input data Y into an encoder of a neural network of a nlDAE;

using the neural network of the nlDAE to learn noise N in the noisy input data Y;

outputting the learned noise N from a decoder of the neural network of the nlDAE; and using a subtractor of the nlDAE to regenerate original data X by subtracting the learned noise N from the noisy input data Y.

10. The method of claim 9, wherein parameters θ and θ' of the neural network are optimized as follows for all i ∈ {1, . . . , M}:

$$\theta^*, \theta'^* = \operatorname{argmin} \frac{1}{M} \sum_{i=1}^{M} \operatorname{Loss}(n(i), g_{\theta'}(f_\theta(y(i))))$$

where Loss is a loss function, n is a realization vector of the noise N, y is a realization vector of the noisy input data Y, M is a number of training dataset, the parameter θ is {W,b}, W is a weight matrix for encoding, b is a bias vector for encoding, the parameter θ' is {W',b'}, W' is a weight matrix for decoding, b' is a bias vector for decoding, $g_{\theta'}$ is a decoding function of the decoder of the neural network, and $f_\theta$ is an encoding function of the encoder of the neural network.

11. The method of claim 10, wherein $f_\theta(y)=S(Wy+b)$, $g_{\theta'}(f_\theta(y))=S(W'(f_\theta(y))+b')$, and S is a sigmoid activation function for neural networks.

12. The method of claim 10, wherein $$\tilde{x}_{nl}^{(j)}$$

is j-th regenerated original data and is represented as follows for all j ∈ {1, . . . , L}:

$$\tilde{x}_{nl}^{(j)} = y^{(j)} - \tilde{n}^{(j)} = y^{(j)} - g_{\theta'^*}\left(f_{\theta^*}\left(y^{(j)}\right)\right),$$

where L is a number of test dataset.

13. The method of claim 9, wherein determining whether to use the nlDAE method or the DAE method is based on at least the ratio between the standard deviation of the noise N and the standard deviation of the original data X.

14. The method of claim 9, wherein determining whether to use the nlDAE method or the DAE method is based on at least the mutual information between the original data X and the noisy input data Y.

15. The method of claim 9, wherein determining whether to use the nlDAE method or the DAE method is based on at least the mutual information between the noise N and the noisy input data Y.

16. The method of claim 9, wherein the neural network of the nlDAE comprises an input layer, an output layer, and one or more hidden layers connecting the input and output layers.

17. A noise learning-based denoising autoencoder (nlDAE) comprising:

a neural network including an encoder and a decoder, wherein the neural network is configured to receive noisy input data Y at inputs to the encoder, learn noise N in the noisy input data Y, and output the learned noise D from the decoder; and a subtractor configured to regenerate original data X by subtracting the learned noise N from the noisy input data Y;

wherein parameters θ and θ' of the neural network are optimized as follows for all i ∈ {1, . . . , M}:

$$\theta^*, \theta'^* = \operatorname{argmin} \frac{1}{M} \sum_{i=1}^{M} \text{Loss}(n(i), g_{\theta'}(f_\theta(y(i))))$$

where Loss is a loss function, n is a realization vector of the noise N, y is a realization vector of the noisy input data Y, M is a number of training dataset, the parameter θ is {W,b}, W is a weight matrix for encoding, b is a bias vector for encoding, the parameter θ' is {W',b'}, W' is a weight matrix for decoding, b' is a bias vector for decoding, $g_{\theta'}$ is a decoding function of the decoder of the neural network, and $f_\theta$ is an encoding function of the encoder of the neural network.

18. The nlDAE of claim 17, wherein $f_\theta(y)=S(Wy+b)$, $g_{\theta'}(f_\theta(y))=S(W'(f_\theta(y))+b')$, and S is a sigmoid activation function for neural networks.

19. The nlDAE of claim 17, wherein $$\tilde{x}_{nl}^{(j)}$$

is a j-th regenerated original data and is represented as follows for all j ∈ {1, . . . , L}:

$$\tilde{x}_{nl}^{(j)} = y^{(j)} - \tilde{n}^{(j)} = y^{(j)} - g_{\theta'^*}\left(f_{\theta^*}\left(y^{(j)}\right)\right),$$

where L is a number of test dataset.

20. The nlDAE of claim 17, wherein the neural network of the nlDAE comprises an input layer, an output layer, and one or more hidden layers connecting the input and output layers.

* * * * *